Dec. 10, 1935.     W. BAHR     2,023,570
ELECTRICALLY CONTROLLED FASTENING MACHINE
Filed March 10, 1934     3 Sheets-Sheet 1
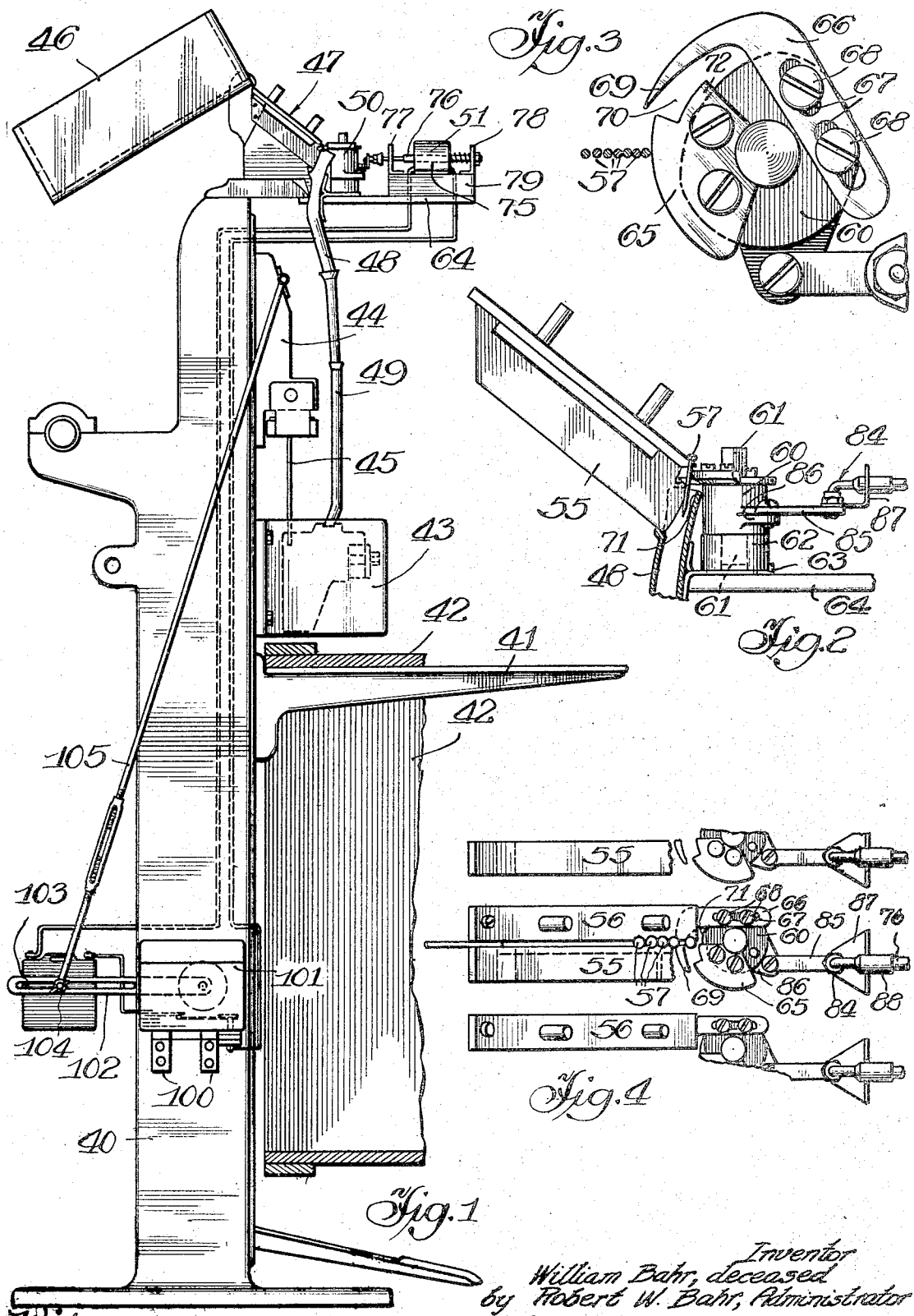

Dec. 10, 1935. W. BAHR 2,023,570

ELECTRICALLY CONTROLLED FASTENING MACHINE

Filed March 10, 1934 3 Sheets-Sheet 2

Inventor
William Bahr, deceased
by Robert W. Bahr, Administrator

By W. Bartlett Jones, Atty.

Witness:
Chas. L. Toursh

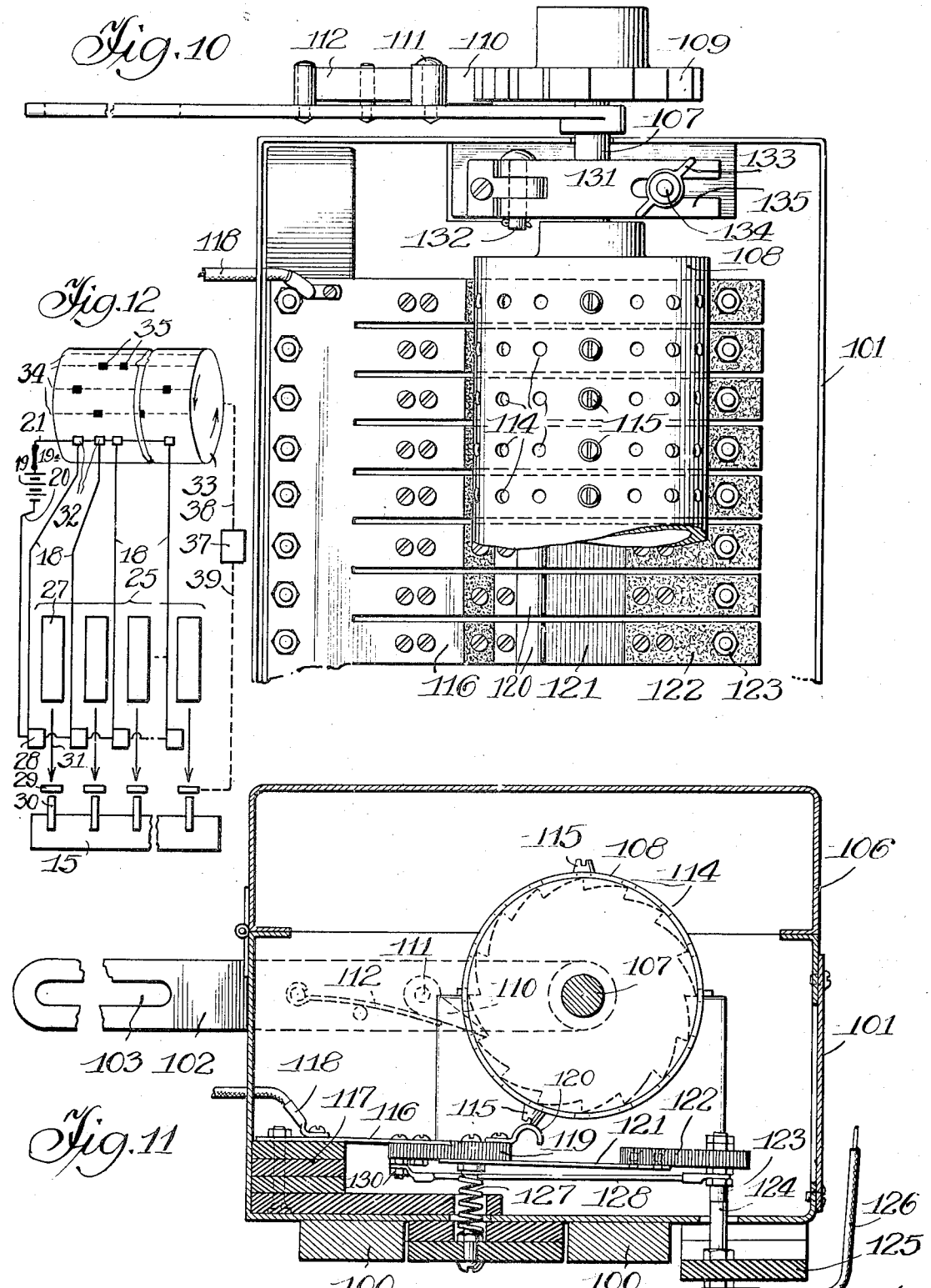

Patented Dec. 10, 1935

2,023,570

UNITED STATES PATENT OFFICE 2,023,570

ELECTRICALLY CONTROLLED FASTENING MACHINE

William Bahr, deceased, late of Deer River, Minn., by Robert W. Bahr, administrator, Deer River, Minn., assignor of one-half to The Northwest Paper Company, Cloquet, Minn., a corporation of Minnesota Application March 10, 1934, Serial No. 714,944

8 Claims. (Cl. 1—16)

The present invention relates to multiple unit fastening machines, and to selective control of the multiple units thereof.

In machines used for inserting nails, staples, tacks, rivets, stitches, and the like, there are frequently multiple units, or a bank of units, adapted to be cut in or out of operation in varying the setting of the machine. Some machines are more completely equipped in this regard and have mechanical devices for cutting in and out one or more units in successive operations of the machines. Such machines having a bank of fastening units include in each unit a mechanical element which is mechanically operated by the machine so as to render the unit ineffective to fasten. The ineffectiveness may depend upon preventing the feeding of a fastener, or upon a mechanical break in operating connection.

Machines of the type above described are likely to be somewhat complex in mechanical structure, and are not flexible in operation, or in changing from one setting to another, and do not provide for the permanent retention of a control element for a given setting.

According to the present invention these disadvantages are overcome and the machine made more flexible in use, and for a change in setting, by providing an independent electrical control for each of a plurality of fastening units, and by providing a master control element for each desired setting of the machine.

One object of the invention is to provide a master control element which may be permanent and quickly removable and replaceable to secure a given setting of the machine.

Another object is the provision of an electrical control system between the bank of fastening units and a permissible remote or convenient location for the master control element.

A particular object of the invention is the provision of a master control element which is cyclic in operation, whereby in successive operations of the machine the fastening units are operated in repeating identical cycles within which each of several operations of the machine, as to the combining of fastening units, may be characteristically different from all of the others.

A particular object of the invention is the provision of a holder for a removable drum, the drum being the master control element.

Another object of the invention is the provision of a drum which may be set and reset to alter its controlling character.

A particular object of the invention is the provision of means which may be attached to a nailing machine in order to adapt it to operate according to, and to embody the apparatus of the present invention, to which end special parts are provided for adapting the nailing units for operation by electrical control.

Various other and ancillary objects and advantages of the invention will appear from the following description and explanation of the invention as it is exemplified generally and specifically in one practically embodiment designed for attachment to well known nailing machines, as shown in the accompanying drawings in which:

Fig. 1 represents in a general view the side elevation of a nailing machine equipped with a device of the present invention.

Fig. 2 is an enlarged detailed view, partly in cross-section, of one nail feeding and selecting unit.

Fig. 3 is a plan view of the nail-picker shown in perspective in Fig. 7 and in side elevation in Fig. 2.

Fig. 4 is a plan view of the structure shown in Fig. 2.

Fig. 10 is a plan view of the interior of a control box showing a control drum and portions of switch structure operated thereby.

Fig. 11 is a vertical cross-section of the structure shown in Fig. 10.

Fig. 12 is a diagrammatic representation of the general assembly of the invention.

The invention is of course capable of being embodied in other machines for which purpose redesign of certain parts may be necessary. Merely because I have chosen to illustrate the invention by reference to its use on a nailing machine, and on a particular type of nailing machine, and by reference to specific designs as illustrative examples, it is not to be understood that the invention is considered as limited to the details and use specifically described. It is therefore to be comprehended that other forms and uses are intended such as may fall within the scope of the invention as defined by the appended claims.

Figure 5:
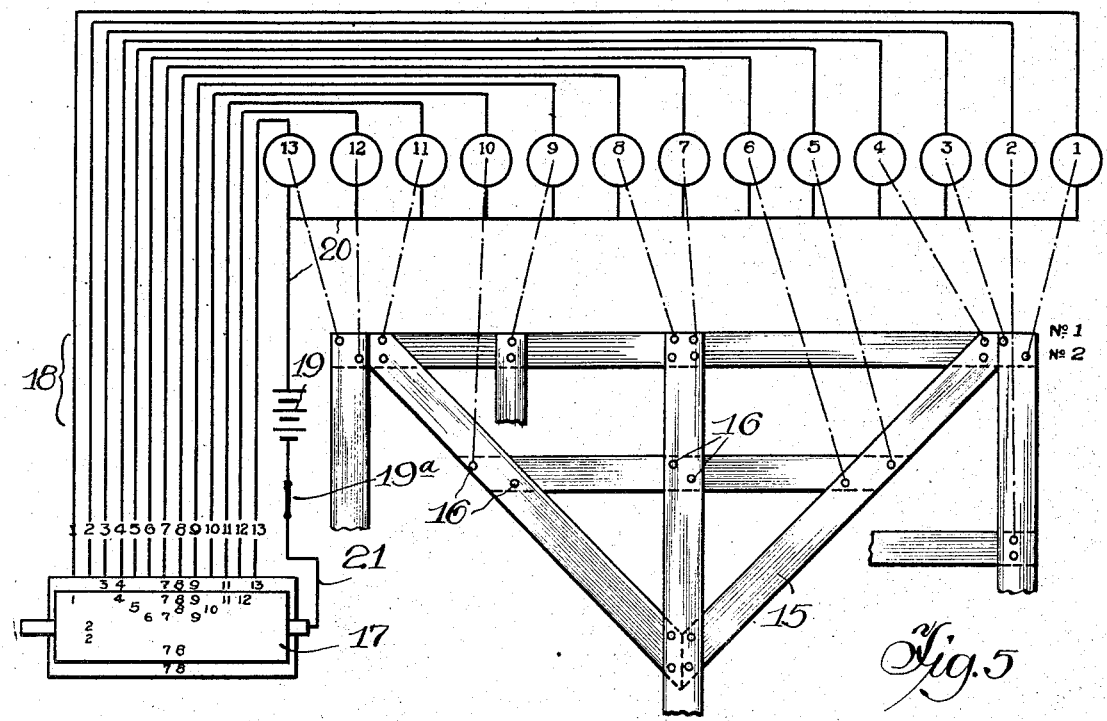
Fig. 5 is a diagrammatic representation of a work-piece as it is related to a plurality of fastening units and a selective control device therefor.

In order better to explain the purposes of the invention reference is made to Fig. 5. The fragmentary end of a structure 15 is representative of an article having fastening means 16 in irregular locations. Such an article is designed with reference to a machine for inserting the fasteners 16. Specifically, the form 15 is a section of a crate held together by nails. The design is such that rows of nails are formed. In a nailing machine there are nailing units arranged in a straight line. But it is not desirable that a nail be inserted by every unit when the machine is operated. The machine herein described is provided with means to insert nails at only certain stations in the row of units at operation No. 1, and to insert nails at a different set of stations at operation No. 2. The structure 15 is preferably designed to require a minimum of operations to complete it. These predetermined operations constitute a cycle of the machine as herein referred to. The positions for inserting fasteners at each operation is determined by a master control element. This is designed to control the machine throughout a cycle, and operates on electric circuits which control the effectiveness of a fastening unit. Preferably the control element is cyclic in operation and it may be designed in one of its cycles to include one or more machine cycles. By such an arrangement irregular structures like that of Fig. 10, having great complexity may be made in repetition in standardized form without any attention to adjustment of the machine between cycles or within a cycle.

In Fig. 5 there is shown a bank of fasteners designated by numbers from 1 to 13, which numbers may be used to refer to "stations" or fastening units which constitute the stations. A master control element of the cyclic character is represented by rotary drum 17, but it may be an endless belt, or a continuous web from a roll, suitably punched, marked, embossed or altered to provide for an operation of an electric switch through appropriate mechanism. Since Fig. 5 is only diagrammatic no specific detail is shown, but there are numbers on the drum indicating the relative points where the drum is effective to control the operation of the stations selectively. This operation is effected by closures of a suitable series of independent circuit wires 18, each being numbered for the station to which it corresponds. A source of electric power 19 is connected by wire 20 to all of the operative electric units of the plurality of stations. Another wire 21 connects to suitable switch means (not shown) which are controlled by the drum 17 for completing circuits in wires 18. The electrical unit in the station may operate in one of many ways to determine the ineffectiveness of the unit. For example, it may prevent the feeding of a fastener, or it may throw out of action some mechanical element essential to operability, or it may interpose some "stop" which is suitably effective. Other means may be so controlled, such details being no essential part of the invention in its broadest aspects.

Fig. 12 is a diagrammatic representation of a machine which may be effective for making the representative structure 15. The lower block designates such structure 15, here shown as extending into the field of operations of all of the fastening units. A bank 25 of identical units is shown. The units may vary in structure, but the one here indicated comprises a supply of fasteners 27, an electrically controlled device 28 which controls the feeding of fasteners from said supply for effectiveness in the unit, a mechanical structure 29 which acts on the fastener to fix it, and a fastener 30 shown entering the work-piece 15, under influence of the mechanism 29. The arrow 31 indicates the course of the fastener 30 from the supply 27 to the work-piece. The individual circuit wires 18 are shown leading from effective switches 32. The source of power 19 and the wires 20 and 21 therefrom are shown extending respectively from the source to the electrical units 28, and to the switches 32.

A master control element is illustrated in the cyclic form of an endless belt 33 on which there are rows 34 of switch-closing means 35 for switches 32. The control element 33 is actuated in suitable progression with the progress of the work in the machine, either continuously or intermittently, and such relation is controlled by mechanism 37, the dotted lines 38 and 39 indicating the correct relation and association of the mechanism respectively to the movement of the control element 33 and the fastening mechanism 29.

As the invention is embodied for illustration in a nailing machine, a drum control is used which is movable step-by-step, under control of the intermittent manual (usually a pedal) control of the operator of the nailing machine. It is of course to be understood that reference is made to that type of nailing machine wherein the operator places the parts to be nailed on a table in the machine, and then initiates nailing action at will by his control of a suitable lever. This usually acts on a clutch which releases itself after a complete revolution of the clutched part. In this revolution the nailing machine goes through one nailing cycle. At a suitable time in this cycle the control element is advanced one step and in its movement of advance it closes and opens a circuit to control the effectiveness of a nailing unit. This may be done in numerous ways, but as herein illustrated there is an electromagnet which effects the release of a nail from the supply. It is only necessary that the nail be released at a time so that where it falls by gravity in the usual manner it is present at a nailing station, on the work, when the hammer or presser descends to strike its head.

Figure 6:
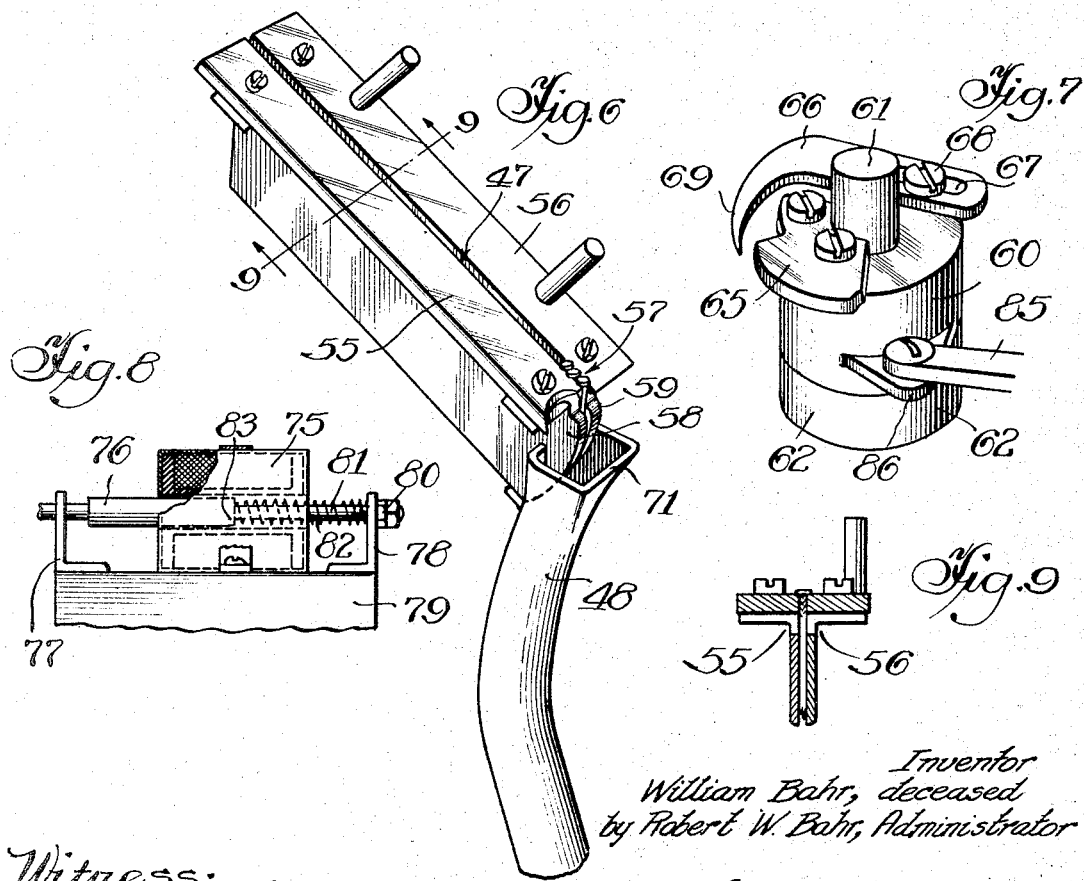
Fig. 6 is a perspective view of the nail race-way and nail-receiver shown in Figs. 2 and 4, with the nail-picker removed.
Figure 7:
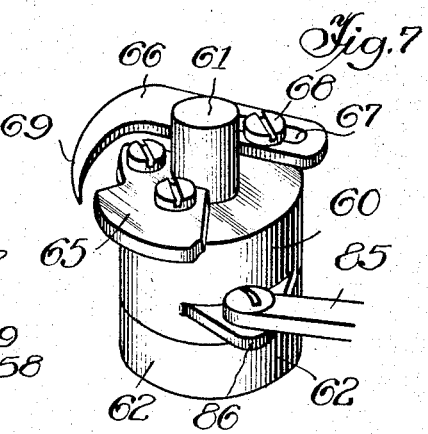
Fig. 7 is a perspective view of the nail-picker.
Figure 9:
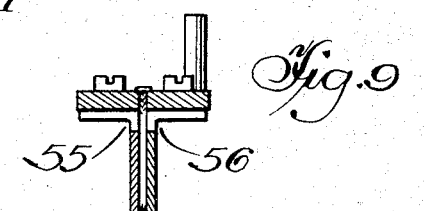
Fig. 9 is a cross-section of a nail race-way on line 9—9 of Fig. 6.

An illustrative nailing machine (see Fig. 1) is shown omitting much of the detail structure which is not pertinent to the present invention. Side standards 40, providing a space for work to pass between them, carry an adjustably mounted work table 41 on which a work-piece such as a box 42 may be placed for nailing operations taking place between the table 41 and the fixed head 43. Above the head is a reciprocal member 44 slidable on the standards to move plungers 45 onto the heads of nails. It is to be understood that there may be a plurality of plungers corresponding to stations for nailing. At the top of the machine the usual supply box 46 of loose nails delivers them to race-ways 47, from each of which a nail is selectively discharged into a receiving funnel 48 at the end of a delivery tube 49. The race-ways of the machine indicated are associated with a nail-picker 50 which positively selects a single nail for release into the tube 49. The nail-picker is operated by an electromagnet 51 under control of one of the described circuits 18 of the diagrammatic views. Although only one such unit is shown in detail, it is to be understood that each of the several race-ways 47, and tubes 49 of the usual nailing machine are similarly equipped. Each race-way 47 consists of the usual two angular plates 55 and 56 (see Figs. 6 and 9) adjustably spaced apart to receive a nail slidably between them. Nails 57 are shown with heads catching on the plates. Nail-picker 50 is placed in front of the inclined race-way. The ends 58 and 59 of the vertical part of angle-plates 55 and 56 may be suitably cut to cooperate with the finger of the picker to assure the nails dropping into the funnel 48, and the funnel may also be suitably shaped to fit about said ends 58 and 59 to receive the nail and to be clear of the picker structure. The structures illustrated are suitable to these ends, and are not particularly described in minute detail.

As shown in detail in Figs. 2 and 4 the picker is positioned in front of the race-way 47. The picker 50 herein employed is pivotally mounted on a vertical axis. It has the general form of a cylinder 60 through which extends a pivoted stem 61 projecting at the bottom into a hole in cylindrical base member 62. The base member is fixed to a bracketed plate 63 carried by brackets 64 attached to the machine proper. The cylinder is thus easily removable for an adjustment which is provided for to accommodate different sized nails. There is mounted on the top of the body 60 a stop plate 65 which is carried by the body to form a stop for nails moving down the race-way, as seen in Fig. 3. The stopping edge of stop plate 65 may be concentric with the axis of stem 61. Also on the top of body 60 there is an adjustably mounted finger 66 which is movable to a position where, as in Fig. 3 it will pick out one nail at a time. The finger is generally L-shaped with elongated slots 67 in one leg for adjustment on the fastening screws 68. The hooking end is sharply pointed as at 69. Plate 65 is sufficiently recessed as at 70 within the hook of finger 66 to provide a large enough recess for the heads of the nails to pass through without danger of catching or sticking. The cylindrical body 60 is sufficiently cut away to allow lip 71 of funnel 48 (Figs. 6 and 2) to be placed out of danger of catching the nail head, and this lip is partially covered during operation by the section 72 of stop plate 65.

Figure 8:
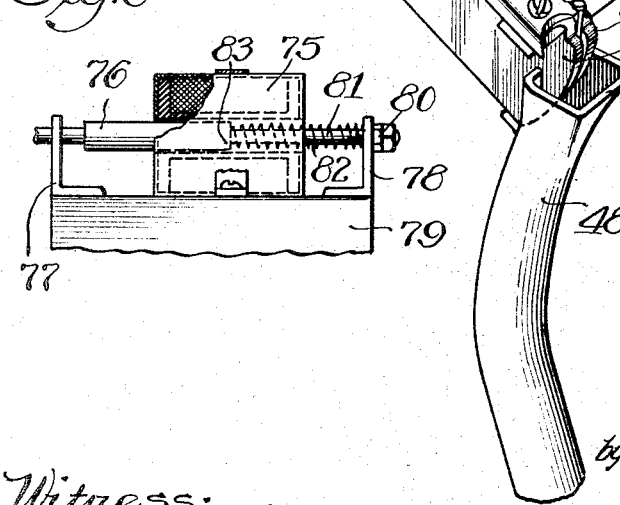
Fig. 8 is a side elevation, partly in cross-section, of an electromotive device for operating the nail-picker.

The turning of the picker is effected by electromotive action. A solenoid 75 and plunger 76 are employed (Fig. 8). The several plungers are mounted in holes in parallel angle bars 77 and 78 mounted on a base 79 carried by the brackets 64. Plunger 76 carries at one end a head in the form of locked nuts 80, and has at said end a smaller diameter stem 81 over which is a compression spring 82 between bracket 78 and shoulder 83. Plunger 76 at the other end is connected (Figs. 2 and 4) by a ball and socket joint 84 to a link 85 pivoted to a lug 86 extending from the cylinder 60. A bifurcated angular guide 87 is used at the end of the plunger 76 which otherwise by reason of the ball joint is freely movable laterally relative to the link 85. The end so guided comprises a screw-threaded connection 88 by reason of which fine adjustment of angular position of the picker is effected. The guide 87 is L-shaped with a horizontal portion mounted fixedly to the link 85 by the structure 84 (Fig. 2) and with its bifurcated vertical portion receiving the connection 88 on the plunger 76. Thus the freedom of motion is constrained at the ball connection and there is no danger of buckling.

The master control element may be located anywhere and is provided with an actuating connection operated by each operation of the machine. While the connection may be an electrical one, I prefer a mechanical one. Where a drum is used, and where different control drums are permitted with differing number of control impulses in the cycle of the machine, it is desirable to actuate the drum to advance it over arcs of different extent. This is simply accomplished with a direct mechanical connection as will appear presently.

On the side of the machine standard 40 (Fig. 1) there are shown brackets 100 carrying a control box 101. A lever 102 with slot 103 is connected at one end for a pawl and ratchet connection with the drum to turn it. The slot 103 affords a movable location for a pivot 104 carrying operating rod 105 which at the other end is connected to a moving part of the machine for actuating the lever with each operating stroke of the machine. For convenience the reciprocating head 44 (which presses the nails into the work) is chosen. The connection through to the drum is preferably such that as the machine returns to final position after a nailing operation, the drum is advanced from one position of rest to the adjacent position of rest, and in its advance it closes and opens the circuits necessary for supplying nails for the next nailing operation. Thus the nails have already dropped and the time delay by gravity fall is not effective to create a possible failure of nail delivery. Of course other timing arrangements are permitted by slight changes without departing from the invention, and the preferable methods may be different for different types of machines embodying the invention.

The box 101 is provided with cover 106, (Fig. 11) a rotary shaft 107 rigid with both a drum 108 and a corresponding ratchet 109. The drum is divided into elemental rows for means to operate the switches, and it is therefore desirable that the ratchet correspond in number of teeth so that each row of such means may be advanced one step. The advance is effected by means of lever 102 which is pivoted on shaft 107, and which carries a dog 110 pivoted at 111, and held in engagement by leaf spring 112. The drum-shaft-ratchet unit is made readily removable so that it can be changed to provide a new control for a different set of operations, permissively having a different number of rows on the drum. The number of rows may be such as to conform to one cycle of machine operations or may be a multiple of the number for one such cycle. As shown there are 16 rows. This may conform to a cycle of 16 operations, a cycle of 8 operations or of 4 or of 2. Each row in the drum has threaded holes 114 into which may be secured the switch operating means. In the present instance these are metal studs 115 screwed into the holes. Thus a drum may be re-set by changing the position of the screws.

The particular switch means which has been provided comprises a resilient metal finger 116 secured to fixed insulation 117 and electrically connected to wire 118. The finger at the end carries a fiber block 119 on which there is a metal tip 120 in the path of one of the screws 115, the character of the tip being such as to give a necessary time of circuit closure as the screw 115 makes contact in the advance of the drum. This timing of course is variable according to specific requirements and structures. The insulation 119 carries a further metal extension 121 of the finger 116 at the end of which is a fiber block 122 with electrical contact 123. A second contact 124 is housed in the bottom of the box 101, insulated therefrom as at 125, and connected to wire 126, corresponding to wires 18 in Fig. 5. A coiled compression spring 127 acts between a fixed part of the box and the insulated extension of finger 116. An electrical connector 128 is secured at one end to fiber block 119 in electrical connection at 130 with metal strip 116, and at the other end to contact 123. Numeral 131 (Fig. 10) shows one bearing for shaft 107, characterized by a portion hinged at 132 and secured by wing nut 133 and its bolt 134 which fits into its slotted end 135. By such bearings and such drum structure, the control unit is free from direct electrical connections and can be changed without regard for or danger from the electrical connections.

The nailing machine of the type described having the usual operating pedal and the well known clutch which disengages itself after one nailing operation, if the pedal is not continuously depressed, is also representative of a machine which can operate continuously with repeated operations of the fastening units. This continued operation is brought about by continuously depressing the operating pedal, as is well known in the art. The present invention as herein described can be used without change to vary the sequence and frequency of fastening in the several fastening units in such a continued operation of the machine. Where the control element is cyclically movable, as where it is an endless belt or a rotating element the machine may go through a sequence of cycles without interruption, and work may be continuously fed through the machine by hand, or mechanically in timed relation to operation of the machine. The latter may be accomplished in numerous ways well known in the art, forming no essential part of the present invention.

It is also to be understood that the invention contemplates that the control element may be disconnected from the means to advance it regularly and that it may be manually moved in a suitable way, or allowed to remain stationary, according to its particular construction, to produce any combination, or to repeat a given combination. In the apparatus illustrated, where the drum 108 is not effective to cause the solenoid to release nails, while the drum is at rest, it will be necessary to move the drum temporarily into a position where the buttons 115 close the desired circuits and thus release nails. This may be done manually or automatically. To do this automatically the link 105 (Fig. 1) may be adjusted at a pivotal point 104 in the slot 103 or arm 102, where the resulting advance of the drum is insufficient to cause pawl 110 to ride over a tooth of ratchet wheel 109. Thus the drum moves only momentarily to close contacts of the switches and to release nails in the same combination in repeating operations. Another way in which the same result may be accomplished is to set the control element in a fixed position to close the selected circuits. By means of a switch in one of the common wires 20 and 21 of all the circuits, the electromotive operation may be effected. Such a switch is shown at 19ª in Figs. 5 and 12, and it may be in the line of wire 118 in Fig. 11. This switch may be manipulated by hand, or it may be operated at each nailing operation of the machine by suitable mechanism (not shown). For example, it may be operated by the link 105, or the arm 102, and be substituted functionally for the pawl and ratchet and be operated instead of the ratchet wheel.

The operation of the illustrative machine particularly described can be readily understood from the nature of the description of it generally in relation to the invention in its broadest aspect and specifically in relation to the structure embodying the invention in its adaptation to a nailing machine. It is obvious that the invention is susceptible to many other embodiments and adaptations without departing from the spirit and scope of the appended claims.

What is claimed is:

1. A fastening machine comprising a plurality of fastening units, a supply of fasteners for said units, mechanism for causing repeated operation of each of said units to effect fastening operations in continued operation of said mechanism, electromotive means associated with each unit and with the supply of fasteners to control the feeding of fasteners to each of said units, an electric circuit containing a switch for each of said electromotive means, a movable control element, adapted to move progressively in continued operation of the machine, switch-controls carried by said element in selected positions, said switches being positioned for controlling-operations by said switch-controls in the progressive movement of said control element, and means connecting said mechanism and said control element for advancing the control element with the operation of said mechanism.

2. A fastening machine comprising a plurality of fastening units, mechanism for causing operation of each of said units to effect a fastening operation, a supply of fasteners for said units, electromotive means associated with each unit and with the supply of fasteners to control the feeding of fasteners to each of said units, an electric circuit containing a switch for each of said electromotive means, a movable control element adapted to move to successive positions, switch controls carried by said element in selected positions, said switches being positioned for controlling-operations by said switch-controls in the movement of said element from one position to another, and means connecting said mechanism and said control element for advancing the control element one position for each operation of said mechanism.

3. A nailing machine comprising a plurality of nailing units, a supply of nails for said units, mechanism for causing operations of each of said units to insert a nail, a nail-picker for supplying one nail to each unit for said supply, electromotive means for moving each nail-picker to feed a nail to the unit, an electric circuit containing a switch for each of said electromotive means, a movable control element adapted to be moved one step in advance with each nailing operation of said mechanism, switch-controls carried by said element in selected positions, said switches being positioned for controlling-operations by said switch-controls in the movement of said control element from one position to another, and means connecting said mechanism and said control element for advancing the control element to a new position with each nailing operation.

4. A fastening machine comprising a plurality of fastening units, a supply of fasteners for said units, an electric circuit for each unit, a switch in each circuit, electromotive means active on energization to feed a fastener to said unit from said supply, a control element movable to different positions, and switch-controls carried by said element at selected positions, said switches being disposed for selective control by said switch-controls according to the position of said control element.

5. A nailing machine comprising a plurality of nailing units, an electric circuit for each unit, a switch in each circuit, an electromotive means in each circuit for controlling the feed of a nail to said unit, a control element movable to different positions, and switch-controls carried by said element at selected positions, said switches being disposed for selective control by said switch-controls according to the position of said control element.

6. A nailing machine comprising a plurality of nailing units, an electric circuit for each unit, a switch in each circuit, a supply of nails, a nail-picker for each unit adapted to feed a nail to each unit from said supply, electromotive means in each circuit for operating the nail-picker to feed a nail, a control element movable to different positions, and switch-controls carried by said element at selected positions, said switches being disposed for selective control by said switch-controls according to the position of said control element.

7. A fastening machine comprising a mechanical fastening unit, mechanism to operate said unit, a supply of fasteners to be fed to said unit, an electromotive device to control the feed of fasteners to said unit, a circuit for said device, a switch in said circuit operable to prevent the feeding of fasteners to said unit when the unit is operated by said mechanism, a movable control element, switch controls carried by said element at selected positions for actuating said switch, and means connecting said mechanism for moving said control element in timed relation to the operation of the unit.

8. In a nailing machine a nail-presser, mechanism for operating the nail-presser, a supply of nails for said presser, a nail-release for feeding from said supply one nail at a time into a position to be acted upon by said nail-presser, an electromotive device to control the operation of the nail-release, an electric circuit for said electromotive means, a switch in said circuit for controlling the operation of the nail release, a movable control element, switch-controls carried by said element at selected positions to operate said switch, and means connecting said mechanism and said movable element to move the element in timed relation with the operation of said nail-presser.

ROBERT W. BAHR,
*Administrator of the Estate of William Bahr, Deceased.*